(12) United States Patent
Martin et al.

(10) Patent No.: US 6,259,427 B1
(45) Date of Patent: Jul. 10, 2001

(54) SCALING MULTI-DIMENSIONAL SIGNALS USING VARIABLE WEIGHTING FACTORS

(75) Inventors: Russel A. Martin, Menlo Park; Ken-Sue Tan, Saratoga, both of CA (US)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

(21) Appl. No.: 09/298,647

(22) Filed: Apr. 23, 1999

Related U.S. Application Data (60) Provisional application No. 60/083,051, filed on Apr. 24, 1998.

(51) Int. Cl.[7] .................................................. G09G 5/36
(52) U.S. Cl. .......................... 345/137; 345/138; 345/428; 358/445
(58) Field of Search .................................. 345/127, 121, 345/132, 328, 55–56, 137, 138, 428; 358/445, 447, 448; 382/299, 298

(56) References Cited

U.S. PATENT DOCUMENTS

| | | | |
|---|---|---|---|
| 4,725,892 | 2/1988 | Suzuki et al. | 358/287 |
| 4,851,825 | * 7/1989 | Naiman | 345/132 |
| 4,970,604 | * 11/1990 | Coueignoux | 358/426 |
| 5,054,100 | 10/1991 | Tai | 382/47 |
| 5,142,616 | * 8/1992 | Kellas et al. | 345/435 |
| 5,335,295 | 8/1994 | Ferracini et al. | 382/47 |
| 5,586,227 | * 12/1996 | Kawana et al. | 358/1.13 |
| 5,612,714 | * 3/1997 | Souviron | 345/127 |
| 5,619,226 | 4/1997 | Cahill, III | 345/132 |
| 5,619,342 | 4/1997 | Shannon | 358/405 |
| 5,694,149 | 12/1997 | Cahill, III | 345/127 |
| 6,201,545 | * 3/2000 | Wong et al. | 345/428 |

FOREIGN PATENT DOCUMENTS

| | | | |
|---|---|---|---|
| 0 525 996 A2 | 2/1992 | (EP) | H04N/1/40 |
| 0 525 996 A3 | 2/1992 | (EP) | H04N/1/40 |

\* cited by examiner

Primary Examiner—Matthew Luu
Assistant Examiner—Thu-Thao Havan
(74) Attorney, Agent, or Firm—Fenwick & West LLP (57) ABSTRACT

An image or other multi-dimensional data set may have its sampling rate changed by determining weighting factors for the values of points in the original (input) data set used to calculate the value of a point in the new (output) data set. The weighting factors are determined using a function, such as a Gaussian function, that takes as input the relative location of the point in the new data set with respect to the locations of surrounding (neighboring) points in the original data set. The values of the points in the original data set are multiplied by the weighting factors, and the resultant products are added (or combined by another function) to give a value of the point in the new data set. In particular, when the input and output data sets are regularly spaced, such as with pixels for computer displays, the locations of the surrounding points and thus their weights repeat periodically. This results in increased efficiency because the surrounding points and their weights need to be determined only for a subset of the output data set.

19 Claims, 4 Drawing Sheets

FIG. 1 PRIOR ART

○ VGA
• XGA

FIG. 2

○ VGA
• XGA

Output Value $O_P$

SCALING MULTI-DIMENSIONAL SIGNALS USING VARIABLE WEIGHTING FACTORS

RELATED APPLICATION

This application claims priority from provisional application Ser. No. 60/083,051 filed on Apr. 24, 1998, which is incorporated by reference herein in its entirety.

BACKGROUND OF THE INVENTION

1. Field of the Invention

This invention relates generally to image signal processing and to systems for displaying images. More particularly, this invention relates to scaling image signals from a first resolution to a second resolution.

2. Description of the Background Art

Various resolutions are utilized to display digital images. For computer monitors, common display resolutions currently include VGA (video graphics array), XGA (extended graphics array), SVGA (super video graphics array), and other display standards. VGA displays typically have a resolution of 640×480 (horizontal x vertical) pixels. SVGA displays typically have a resolution of 800×600 pixels. XGA displays typically have a resolution of 1024×768 pixels. SXGA displays typically have a resolution of 1280×1024 pixels.

It often occurs in computer-related applications that a digital image must be scaled from one resolution to another resolution. Scaling an image from one resolution to another resolution may be thought of as changing the sampling rate of the image. Scaling of an image signal would be necessary, for example, when a change is made in the resolution at which a display monitor is being operated. For instance, a computer user may change (by way of a function in the Windows operating system) the display resolution from VGA to XGA (or vice-versa) in the middle of a session. Another example where such scaling would be necessary is when an image having a certain resolution is to be printed on a printer having a different resolution.

SUMMARY OF THE INVENTION

The present invention provides a particularly efficient and effective method for scaling image signals from a first resolution to a second resolution. In accordance with the present invention, an image or other multi-dimensional data set may have its sampling rate changed by determining weighting factors for the values of points in the original (input) data set used to calculate the value of a point in the new (output) data set. The weighting factors are determined using a function, such as a Gaussian function, that takes as input the relative location of the point in the new data set with respect to the locations of surrounding (neighboring) points in the original data set. The values of the points in the original data set are multiplied by the weighting factors, and the resultant products are added (or combined by another function) to give a value of the point in the new data set. In particular, when the input and output data sets are regularly spaced, such as with pixels for computer displays, the locations of the surrounding points and thus their weights repeat periodically. This results in increased efficiency because the surrounding points and their weights need to be determined only for a subset of the output data set.

DETAILED DESCRIPTION OF THE PREFERRED EMBODIMENTS

There are many situations in which it is valuable to change the sampling rate of a multi-dimensional signal. One important example is the scaling of an image from one resolution to another resolution. For example, taking an incoming VGA image and converting it to an outgoing XGA image. The incoming data is on one grid and points of the outgoing grid fall between these points or lie on top of them. The present invention details a new method for scaling an image that is flexible, gives a high image quality, and may be implemented very efficiently with hardware circuitry. The hardware implementations are very efficient because the method requires very few computations when the incoming and outgoing grids are known ahead of time.

In the present invention, variable weights are computed for neighboring pixels in the original signal based upon their distance from a new pixel. The values of these weights are normalized and multiplied by the value of the image at those neighboring pixels in the original image. These products are combined, usually by addition, to form the value for the new pixel in the outgoing image. The values of the weights are determined by a mathematical function that takes the distance (and possibly the direction) to the neighboring, incoming points as the input.

Figure 1:
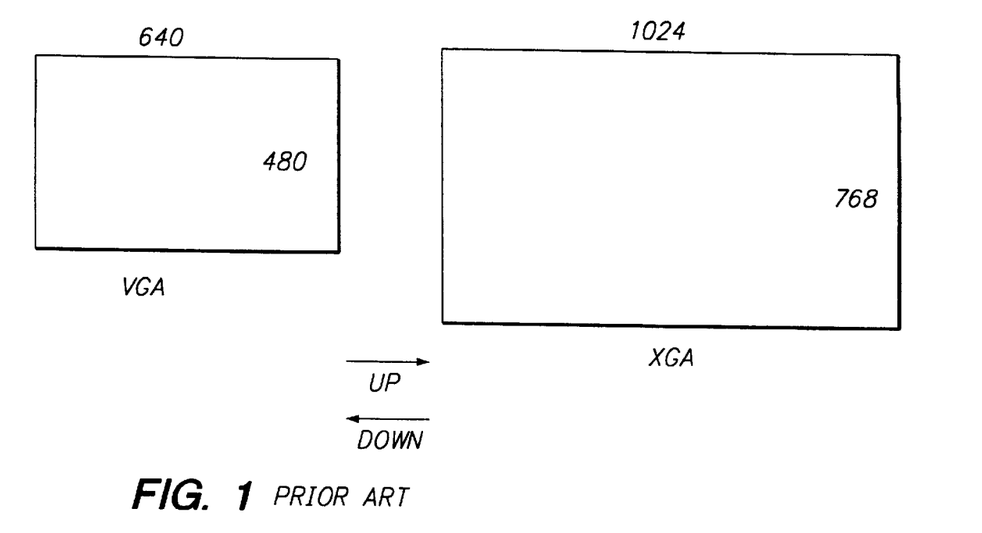
FIG. 1 is a schematic diagram showing two of many possible image resolutions.

An example of converting an image from a VGA resolution to a XGA resolution may be used to illustrate the present invention. FIG. 1 is a schematic diagram showing VGA and XGA resolutions. In converting VGA data to XGA data, the ratio of the resolutions from VGA to XGA are 5 to 8. This is because horizontally, 640(VGA)/1024(XGA)=⅝, and vertically 480(VGA)/768(XGA)=⅝. In FIG. 1, the conversion from VGA resolution to XGA resolution is denoted as an "up" scaling, while the opposite conversion from XGA resolution to VGA resolution is denoted as a "down" scaling. Thus, our example involves the up scaling from VGA resolution to XGA resolution. However, the present invention is also applicable to down scaling as well.

Figure 2:
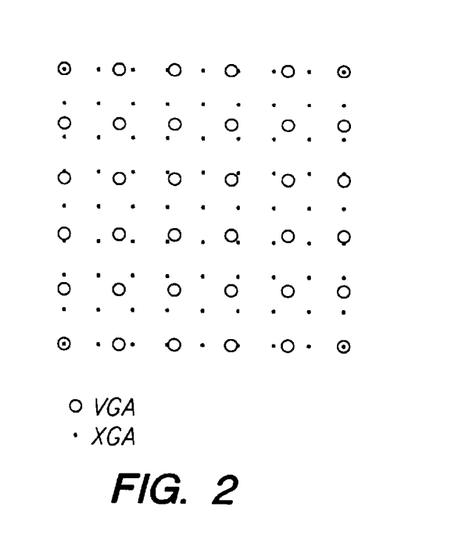
FIG. 2 is a diagram illustrating the juxtaposition of pixel positions for two of many possible image resolutions in accordance with a preferred embodiment of the present invention.

FIG. 2 is a diagram illustrating the juxtaposition of pixel positions for the VGA (open dots) and XGA (solid dots) resolutions. Since the ratio is 5 to 8, for every 25 (5 squared)

VGA pixels, there are 64 (8 squared) XGA pixels. Of course, since VGA and XGA images are in color, there are actually three pixels (one for each primary color) corresponding to each of the pixel positions shown in FIG. 2. The present invention may be applied independently to pixels for each of the three component colors.

Figure 3A:
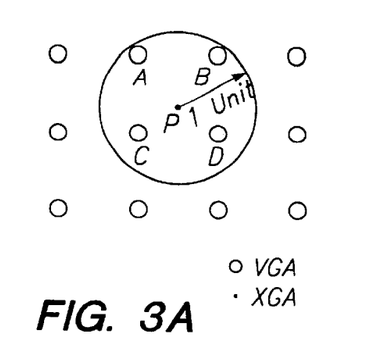
FIGS. 3A, 3B, and 3C are diagrams illustrating neighboring input pixel positions surrounding particular output pixel positions in accordance with a preferred embodiment of the present invention.
Figure 3B:
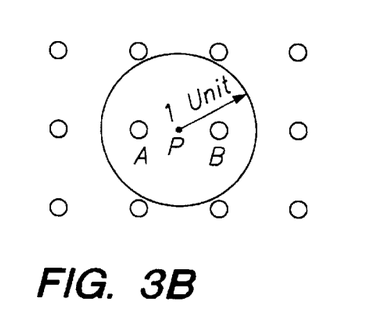
Figure 3C:
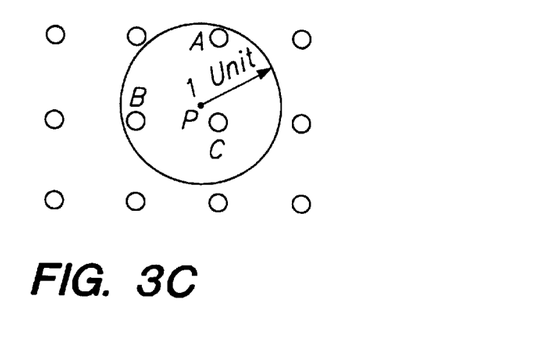

FIGS. 3A, 3B, and 3C are diagrams illustrating neighboring input pixel positions surrounding particular output pixel positions in accordance with a preferred embodiment of the present invention. In a preferred embodiment of the present invention, only neighboring input (VGA) pixels within a unit distance of the particular output (XGA) pixel P are used to calculate the value of the particular output pixel, the unit distance in this case being the shortest distance between the input (VGA) pixels. For the particular output pixel P shown in FIG. 3A, there are four neighboring input pixels within the unit distance. These four neighboring input pixels are denoted input pixels A, B, C, and D.

Depending on the location of the particular output pixel, there may be four, three, or two neighboring input pixels within the unit distance. The neighboring input pixels within the unit distance have non-zero weighting factors, while the neighboring input pixels outside the unit distance have weighting factors of zero.

The particular output pixel P shown in FIG. 3A has four neighboring input pixels within the unit distance. However, the particular output pixel P shown in FIG. 3B has only two neighboring input pixels within the unit distance. These two neighboring input pixels are denoted input pixels A and B. Similarly, the particular output pixel P shown in FIG. 3C has only three neighboring input pixels within the unit distance. These three neighboring input pixels are denoted input pixels A, B, and C.

Of course, distances other than the unit distance may also be used to determine the neighboring input pixels to have non-zero weighting factors. For example, a circle with a radius of R times the unit distance may be used to determine the neighboring input pixels having non-zero weighting factors, where R>0. For example, R may be 2, or 1.5, or the square root of 2. Typically, down scaling conversions require larger R values than up scaling conversions.

Figure 4:
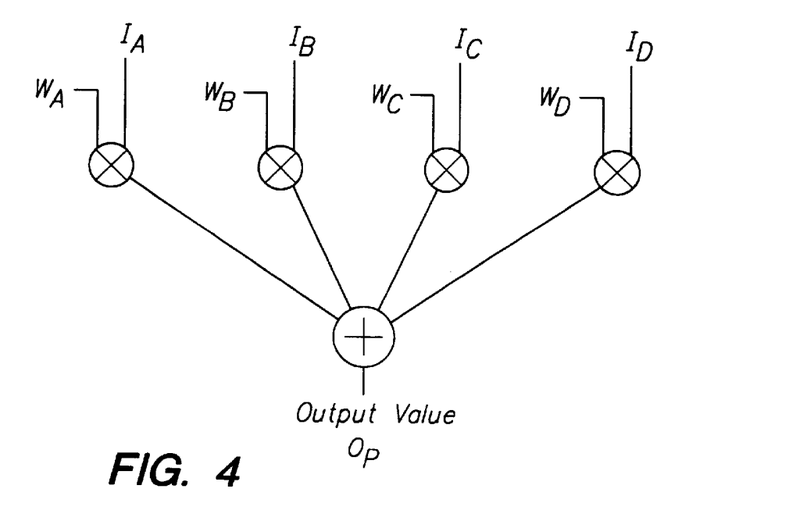
FIG. 4 is a schematic circuit diagram at a logic level for calculating output pixel value based on a variable weighted summation of neighboring input pixel values in accordance with a preferred embodiment of the present invention.

FIG. 4 is a schematic circuit diagram at a logic level for calculating output pixel value based on a variable weighted summation of neighboring input pixel values in accordance with a preferred embodiment of the present invention. The output value $O_P=(I_A*W_A)+(I_B*W_B)+(I_C*W_C)+(I_D*W_D)$. The intensities of the input pixels A, B, C, and D are represented by $I_A$, $I_B$, $I_C$, and $I_D$, respectively. The weighting factors for the input pixels A, B, C, and D are represented by $W_A$, $W_B$, $W_C$, and $W_D$, respectively. Of course, other functions (instead of the linear function above) of the intensities and weighting factors may be used to calculate the output value. Furthermore, the output value $O_P$ may be normalized so that it represents an output intensity for the output pixel P.

In a preferred embodiment of the present invention, a Gaussian function (normal distribution) is used to determine the weighting factors. This gives weights that decrease as the distances from the output pixel increase. Of course, non-Gaussian functions may also be used. Use of a Gaussian function is typically appropriate because the Gaussian function is a smoothly peaked function and because the beam of a CRT display results in a Gaussian intensity distribution. In particular, such a Gaussian function is $$W_i = A*\exp[-0.5*(x_i/\lambda)^2]$$

where $W_i$ is the weighting factor for neighbor i; A is a normalization factor; $x_i$ is the distance from the output pixel position P and the input pixel position of neighbor i; and $\lambda$ is a parameter characterizing the width of the Gaussian function. The distance $x_i$ is in units such that unity (1) corresponds to the distance between nearest neighboring input pixels.

In the particular case where the output pixel location is in the center between four neighboring input pixels, then the non-zero weights $W_i$ are all equal to each other. In such a case, the intensities of the neighboring input pixels are simply averaged to generate the intensity of the output pixel.

In the particular case where the neighboring input pixels are of equal value, then the intensity of the output pixel surrounded by the input pixels has the same value. In other words, areas with constant input intensity become areas with constant output intensity.

Depending on the width of the Gaussian (determined by the parameter $\lambda$), there can be various amounts of blending between pixels. The narrower the Gaussian, the transitions between pixels (hence edges) are sharper. In general, the parameter $\lambda$ appears to preferably be about 0.5 according to experimental results. For some natural images, a larger value for $\lambda$ of around 0.8 appears to work well as it reduces high frequency components at edges.

Experiments have shown that the image quality on a variety of images applying a Gaussian function on up to 4 neighboring pixels in accordance with the present invention matches the image quality from applying a cubic fit on up to 16 neighboring pixels in accordance with interpolation techniques in the prior art. Thus, for the same image quality, the method of the present invention is shown to be significantly more efficient, require substantially fewer calculations, and require less real memory than prior art techniques.

Furthermore, in a preferred embodiment of the present invention, the non-zero weighting factors are chosen in an approximate manner such that the weighting factors sum to $2^N$. Specifically, in a preferred embodiment, N=8, so that the weighting factors add up to 256. This allows the output value $O_P$ to be normalized by simply ignoring the least significant 8 bits of the output value $O_P$. Thus, the required normalization may be built into the adder used to generate the output value $O_P$ without the use of any additional clock cycles. This further increases the efficiency of the method of the present invention over the prior art methods.

When the input and output resolutions are regularly spaced, such as with pixels for computer displays, the neighbors and their weights repeat periodically. Thus, the neighbors and their weights need to be determined only for a subset of the output data set. This further increases the efficiency of the present invention.

Moreover, when the input and output resolutions are known ahead of time, the neighbors and their weights may be computed ahead of time and a look-up table used. This means that the Gaussian function does not need to be computed in real time. This further increases the efficiency of the present invention.

Figure 5:
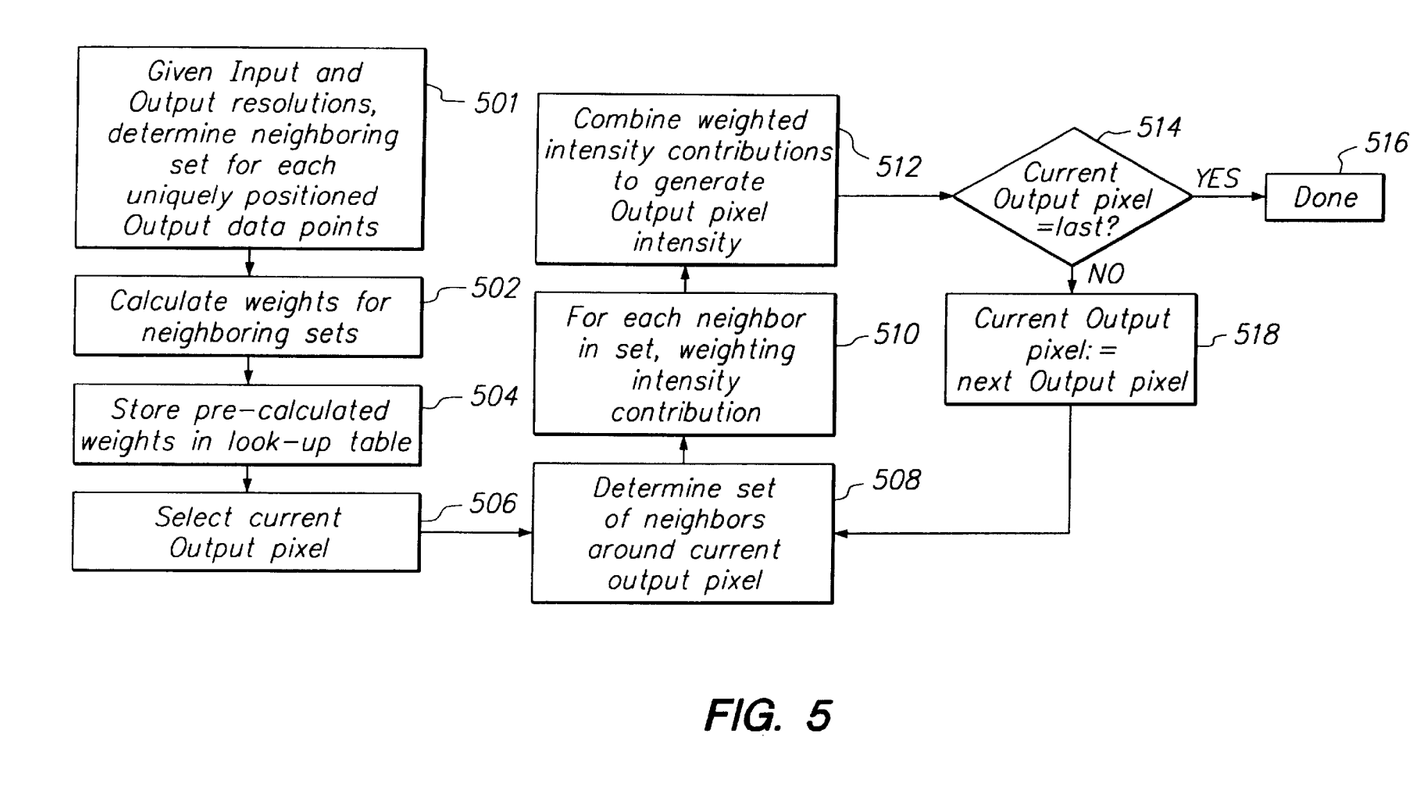
FIG. 5 is a flow chart showing a method for scaling an image signal from an input resolution to an output resolution in accordance with a preferred embodiment of the present invention.

FIG. 5 is a flow chart showing a method for scaling an image signal from an input resolution to an output resolution in accordance with a preferred embodiment of the present invention. Given input and output data sets, the method begins by determining 501 a set of neighbors surrounding each uniquely positioned output pixel and pre-calculating 502 the weighting factors for the neighbors in each set. These pre-calculated weighting factors are then stored 504 in a look-up table. After these first two steps 502 and 504 relating to precalculating the weighting factors, these weighting factors are applied repeatedly to achieve the scaling.

First, a first output pixel is selected 506 to be the current output pixel for the purposes of this method. The first output pixel may, for example, be the upper leftmost pixel of a region. For the current output pixel, the set of neighboring input pixels (within a prescribed distance) is determined 508. For each neighbor in the set, the input pixel intensity corresponding to that neighbor is weighted 510 by the appropriate pre-calculated weighting factor. The weighted intensity contributions are then combined 512 to generate the intensity for the current output pixel. As discussed above, normalization of the output pixel intensity may be done automatically using weighting factors that add up to $2^N$ for each output pixel. If 514 the current output pixel is the last to be calculated, then the process is done 516. Otherwise, the next output pixel is chosen 518 to be the current output pixel, and the method loops back to determine 508 the set of neighbors around the new current output pixel. The next output pixel may, for example, be chosen by going to a next adjacent pixel within a row, and progressing row by row through the region.

Figure 6A:
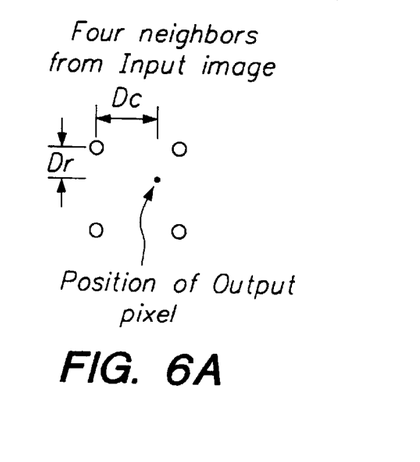
FIG. 6 is a schematic diagram showing use of a matrix of locations to approximate the output pixel position in accordance with a preferred embodiment of the present invention.

FIG. 6 is a schematic diagram showing use of a matrix of locations to approximate the output pixel position in accordance with a preferred embodiment of the present invention. FIG. 6(*a*) shows, for purposes of illustration, the position of an output pixel in relation to four neighboring input pixels. Relative to the input pixel in the upper left position, the distance of the output pixel in the column direction is represented by $D_c$. Similarly, relative to the input pixel in the upper left position, the distance of the output pixel in the row direction is represented by $D_r$.

Figure 6B:
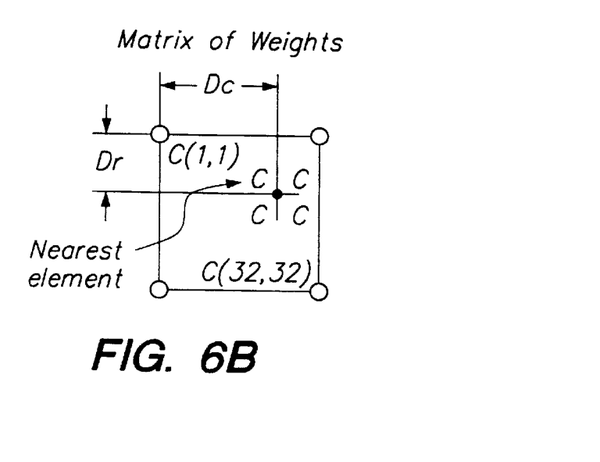

The method described above in relation to FIGS. 2–5 assumed that the exact position of the output pixel was to be used in calculating the weighting factors. However, as described here in relation to FIG. 6, a matrix of locations may be used to approximate the position of the output pixel. FIG. 6(*b*) shows, for purposes of illustration, the output pixel position in relation to nearby matrix elements. The matrix elements are represented by the letter c. For the example shown in FIG. 6(*b*), a matrix of 32×32 evenly-spaced elements c is located within the rectangular region defined by four input pixels at its corners. The upper-leftmost matrix element is denoted as c(1,1) and the lower-rightmost matrix element is denoted as c(32,32). The exact position of the output pixel is shown in relation to four nearby matrix elements c. The nearest element c in particular is shown. In effect, the position of the output pixel is approximated to be the position of the nearest element c. In practice, weighting factors for the neighboring input pixels are stored in correspondence with each element c. For the example illustrated in FIG. 6, in correspondence with each element c would be stored four weighting factors, one for each neighboring input pixel. In an alternative embodiment of the present invention, symmetry of the elements c may be used to reduce the number of weighting factors actually stored in memory.

For the example where a VGA image is being scaled to a XGA image, the distances in the column direction from the first nine output pixels to the upper-leftmost input pixel are 0, 5/8, 5/4, 15/8, 5/2, 25/8, 15/4, 35/8, and 5 (in units of the distance between nearest input pixels). The fractional parts of these nine distances are 0, ⅝, ¼, ⅞, ½, ⅛, ¾, ⅜, and 0. Thus, for this particular example, the distances work out to exact multiples of 1/32. Therefore, for this particular example, the method of approximation yields the same results as the exact method.

However, the results are not typically the same for other scalings. For example, expanding the DOS Mode 3 resolution of 640×350 to the XGA resolution of 1024×768 yields a non-exact result using the approximation method. For this example, the exact method would take an excessively large matrix of 384×384 elements to do exactly, since the row scaling is 350/768 which reduces at most to 175/384. For this scaling, the distances in the column direction from the first nine output pixels (for purposes of illustration) to the upper-leftmost input pixel are 0, 175/384, 175/192, 175/128, 175/96, 875/384, 175/64, 1225/384, and 175/48 (in units of the distance between nearest input pixels). The fractional parts of these nine distances in 32nds are about 0, 14.6/32, 29.2/32, 11.75/32, 26.3/32, 8.9/32, 23.5/32, 6.1/32, and 20.7/32. When rounded to even 32nds, these nine distances are approximately 0, 15/32, 29/32, 12/32, 26/32, 9/32, 24/32, 6/32, and 21/32.

This method of approximation is advantageous because it accurately approximates the exact method while allowing for further increased efficiency in the process. In the example described above, a 32×32 matrix is used, but of course other sized matrices may be used. The 32×32 size allows for a good approximation where the repeating block is very large, while having efficiencies due to the fact that $32=2^N$, where N=5.

Figure 7:
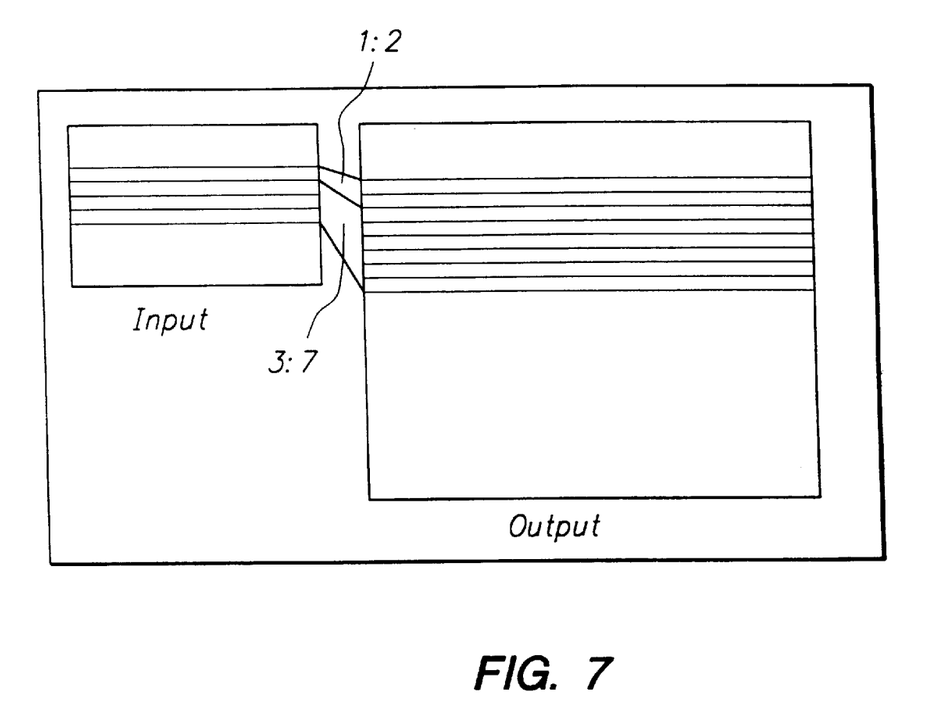
FIG. 7 is a schematic diagram illustrating an interleaving of multiple subscalings to effect an overall image scaling in accordance with a preferred embodiment of the present invention.

FIG. 7 is a schematic diagram (not to scale) illustrating an interleaving of multiple subscalings to effect an overall image scaling in accordance with a preferred embodiment of the present invention. Such an interleaving method may be advantageous, for example, when scaling an input image of 640×480 resolution to an output image of 1280×1024 resolution. The ratio in the column direction is 640/1280=½. The ratio in the row direction is 480/1024 reduces to 15/32.

The scaling from an input image of 640×480 resolution to an output image of 1280×1024 resolution may be accomplished using the method described above in relation to FIGS. 2–6. However, it may be more efficient to accomplish the scaling using interleaving method described below.

No interleaving of multiple subscalings is useful in the column direction because the scaling in the column direction is a simple 1:2. However, interleaving of multiple subscalings is useful in the row direction, because the scaling in the row direction is 15/32. It turns out that 288×1+64×3=480, and 288×2+64×7=1024. Therefore, the scaling in the row direction of 480:1024 may be broken up into 288 "subscalings" of 1:2 and 64 "subscalings" of 3:7. To make the image as uniform as possible, the two types of subscalings are interleaved as evenly as possible within each other. In this example, 288/64=4.5, so the 3:7 subscaling should be put in between every 4 or 5 of the 2:1 subscalings to make up the correct total of each.

For different input and output data sets, this interleaving method may be applicable to both column and row directions, to the row direction only (as the example above), or to the column direction only. This interleaving method could also be applied to signals of any number of dimensions (not only 2-dimensional signals). Further, it may be applied to either expansion (up scaling) or contraction (down scaling).

It is to be understood that the specific mechanisms and techniques which have been described are merely illustrative of one application of the principles of the invention. Numerous additional modifications may be made to the methods and apparatus described without departing from the true spirit of the invention.

For example, while the present invention has been described using an example of an up scaling from VGA to XGA resolutions, the present invention is clearly applicable in general to a scaling (either up or down) from a first image resolution to a second image resolution.

Moreover, while the present invention is described above using an example of changing the sampling rate of a two-dimensional image signal, the present invention is clearly applicable to changing the sampling rate of multi-dimensional signals in general (including one-dimensional signals, three-dimensional signals, and N-dimensional signals). In particular, for example, video may be thought of as a three-dimensional signal, where two-dimensions correspond to a single frame and the third dimension corresponds to the sequence of frames. In the case of video, the present invention would be applicable when scaling the third dimension such that the sampling rate of the video changes, for example, from 85 frames per second to 60 frames per second.

In addition, while the present invention is described above using a Gaussian function for determining the variable weighting factors, the present invention contemplates using various other ways to compute the weights. The Gaussian function is merely one way which is appropriate for scaling two-dimensional images.

Furthermore, while the present invention is described above as using one set of weighting factors for achieving a conversion, the present invention contemplates systems which may utilize any of two or more sets of weighting factors depending on characteristics of the input data set. For the instance where the input data set comprises an image, such a system may, for example, rectify and filter the image to determine characteristics of the image and choose the particular set of weighting factor to apply accordingly. For example, a different set of weighting factors may be used for text than for photographic images. The set of weighting factors for text may, for example, be determined using a square wave function, while the set of weighting factors for the photographic images may, for example, be determined using a Gaussian function.

As a final example, while the present invention is described above using a linear function to determine the value at an output point, the present invention contemplates that other functions may be used to determine the value at an output point. For example, the value at an output point may be determined by a quadratic function (i.e. a weighted sum of squares).

What is claimed is:

1. A method for scaling an input data set to an output data set, where the input data set comprises input data points at a first scale and corresponding input data values, and the output data set comprises output data points at a second scale and corresponding output data values, the method comprising:
   (a) determining a current neighboring set of input data points surrounding at least each uniquely positioned output data point;
   (b) pre-calculating weighting factors for the current neighboring set of input data points surrounding at least each uniquely positioned output data point;
   (c) selecting the current neighboring set of input data points surrounding a current output data point;
   (d) for each input data point in the current neighboring set, weighting the corresponding input data value by a weighting factor to generate a weighted contribution;
   (e) combining the weighted contributions for each input data point in the neighboring set to generate a current output data value corresponding to the current output data point; and
   (f) if the current output data point is not a last output data point, then selecting a next output data point to be the current output data point and looping back to step (c).

2. The method of claim 1, wherein the input and output data sets comprise respectively input and output images, the input and output data points comprise respectively pixels of the input and output images, the first and second scales comprise respectively first and second image resolutions, and the input and output data values comprise respectively input and output pixel intensities.

3. The method of claim 1, wherein the current neighboring set of input data points surrounding the current output data point comprises input data points within a predetermined distance from the current output data point.

4. The method of claim 3, wherein the current neighboring set of input data points includes a variable number of input data points depending on positioning of the current output data point.

5. The method of claim 3, wherein the first distance comprises approximately a minimum distance between input data points.

6. The method of claim 1, wherein the weighting factor is dependent on a distance between the input data point and the current output data point.

7. The method of claim 6, wherein the weighting factor is calculated using a Gaussian function of the distance between the input data point and the current output data point.

8. The method of claim 7, wherein at least two sets of weighting factors are used based on characteristics of the input data set.

9. The method of claim 8, wherein the Gaussian function is proportional to $\exp[-0.5*(x/\lambda)^2]$, where x comprises the distance between the input data point and the current output data point, $\lambda$ comprises a Gaussian parameter, and $\lambda$ is less than 1.

10. The method of claim 1, wherein weighting factors for all input data points in the current neighboring set add up to a total of $2^N$, where N is a positive integer.

11. The method of claim 10, wherein the current output data value is normalized by ignoring N least significant bits.

12. The method of claim 10, wherein the weighting factors for all input data points in the current neighboring set add up to a total of 256.

13. The method of claim 1, wherein combining the weighted contributions comprises linearly combining the weighted contributions.

14. The method of claim 1, wherein combining the weighted contributions comprises quadratically combining the weighted contributions.

15. The method of claim 1, wherein positioning of the current output data point is approximated using a matrix of positions.

16. The method of claim 15, wherein the weighting factor is approximated using the approximate positioning of the current output data point.

17. The method of claim 1, wherein scaling the input data set to the output data set comprises interleaved subscaling in at least one dimension of the scaling.

18. The method of claim 1, wherein the input and output data sets comprise input video and output video.

19. An integrated circuit for scaling an input data set to an output data set, where the input data set comprises input data points at a first scale and corresponding input data values, and the output data set comprises output data points at a second scale and corresponding output data values, the circuit comprising:
   a circuit adapted to determine a current neighboring set of input data points surrounding at least each uniquely positioned output data point;
   a calculating circuit adapted to pre-calculate weighting factors for the current neighboring set of input data points surrounding at least each uniquely positioned output data point;

a selection circuit adapted to select the current neighboring set of input data points surrounding a current output data point;

a weighting circuit adapted to, for each input data point in the current neighboring set, weight the corresponding input data value by a weighting factor to generate a weighted contribution;

a combining circuit adapted to combine the weighted contributions for each input data point in the neighboring set to generate a current output data value corresponding to the current output data point; and a looping circuit adapted to select a next output data point to be the current output data point if the current output data point is not a last output data point.

* * * * *

UNITED STATES PATENT AND TRADEMARK OFFICE
CERTIFICATE OF CORRECTION

PATENT NO. : 6,259,427 B1
DATED : July 10, 2001
INVENTOR(S) : Russel A. Martin, Ken-Sue Tan It is certified that error appears in the above-identified patent and that said Letters Patent is hereby corrected as shown below:

<u>Title page,</u>
Under "References Cited, U.S. Patent Documents" please insert -- 4,381,547   4/26/83   Ejiri   382/47 --

Signed and Sealed this

Ninth Day of April, 2002

*Attest:*

JAMES E. ROGAN
*Attesting Officer*   *Director of the United States Patent and Trademark Office*